(12) United States Patent
Specht et al.

(10) Patent No.: US 8,662,538 B2
(45) Date of Patent: Mar. 4, 2014

(54) BELT RETRACTOR FOR A VEHICLE SAFETY BELT

(75) Inventors: Martin Specht, Feldafing (DE); Wolff Rainer, Andechs (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 4 days.

(21) Appl. No.: 13/384,670

(22) PCT Filed: Jul. 21, 2010

(86) PCT No.: PCT/EP2010/004469
§ 371 (c)(1),
(2), (4) Date: Jan. 18, 2012

(87) PCT Pub. No.: WO2011/009608
PCT Pub. Date: Jan. 27, 2011

(65) Prior Publication Data
US 2012/0111985 A1     May 10, 2012

(30) Foreign Application Priority Data

Jul. 21, 2009   (DE) ................. 10 2009 034 048

(51) Int. Cl.
*B60R 22/405*   (2006.01)
*B60R 22/41*    (2006.01)

(52) U.S. Cl.
USPC .............. 280/806; 242/383.1; 242/384.1; 297/478

(58) Field of Classification Search
USPC ........ 280/806, 807; 297/476, 478; 242/382.2, 242/383.1, 384.1
See application file for complete search history.

(56) References Cited

U.S. PATENT DOCUMENTS

| | | | |
|---|---|---|---|
| 5,441,209 A * | 8/1995 | Fujimura et al. | 242/384 |
| 5,518,197 A * | 5/1996 | Gray | 242/382.2 |
| 5,826,813 A * | 10/1998 | Hibata | 242/383.1 |
| 6,152,393 A * | 11/2000 | Ando et al. | 242/382.2 |
| 7,083,135 B2 * | 8/2006 | Fleischmann et al. | 242/382.2 |
| 7,384,014 B2 * | 6/2008 | Ver Hoven et al. | 242/382.2 |
| 7,823,824 B2 * | 11/2010 | Benner | 242/372 |
| 2005/0011983 A1 * | 1/2005 | Inuzuka et al. | 242/390.9 |
| 2009/0057470 A1 * | 3/2009 | Hiramatsu et al. | 242/396.1 |

FOREIGN PATENT DOCUMENTS

JP   09058410 A *   3/1997   ............. B60R 22/36

* cited by examiner

*Primary Examiner* — Drew Brown
(74) *Attorney, Agent, or Firm* — Markell Seitzman

(57) ABSTRACT

A belt retractor for a vehicle safety belt, comprising a belt reel 2 onto which the safety belt is wound when the belt strap is reeled in and from which the safety belt can be unwound when the belt strap is pulled out, a belt strap-sensitive blocking mechanism 12 which blocks extension of the belt strap when the belt strap is extended with excessive acceleration, wherein a retarding device 1 which prevents activation of the belt strap-sensitive blocking mechanism along a specified length of belt strap extension at the beginning of the belt strap extension process is rotatably connected to the belt reel 2.

15 Claims, 8 Drawing Sheets

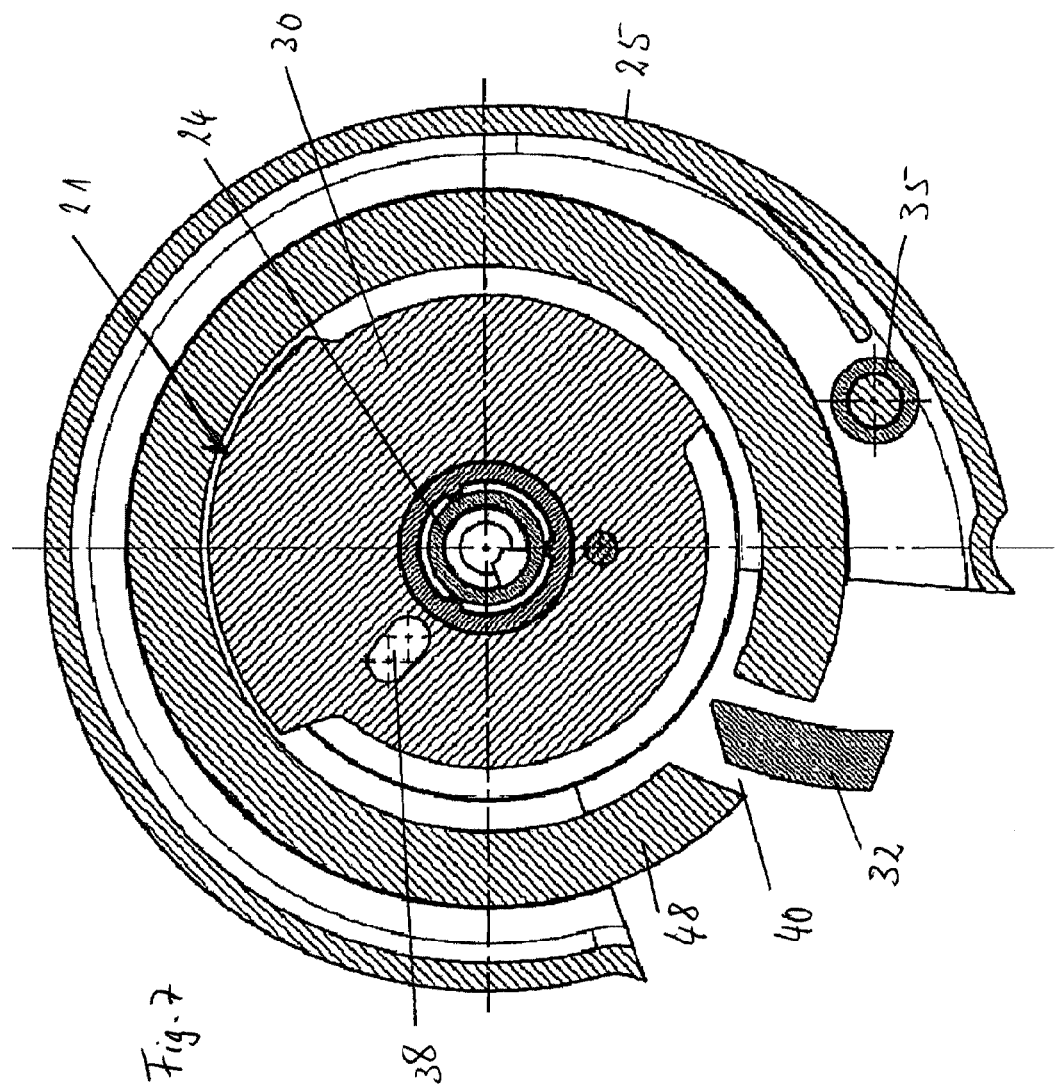

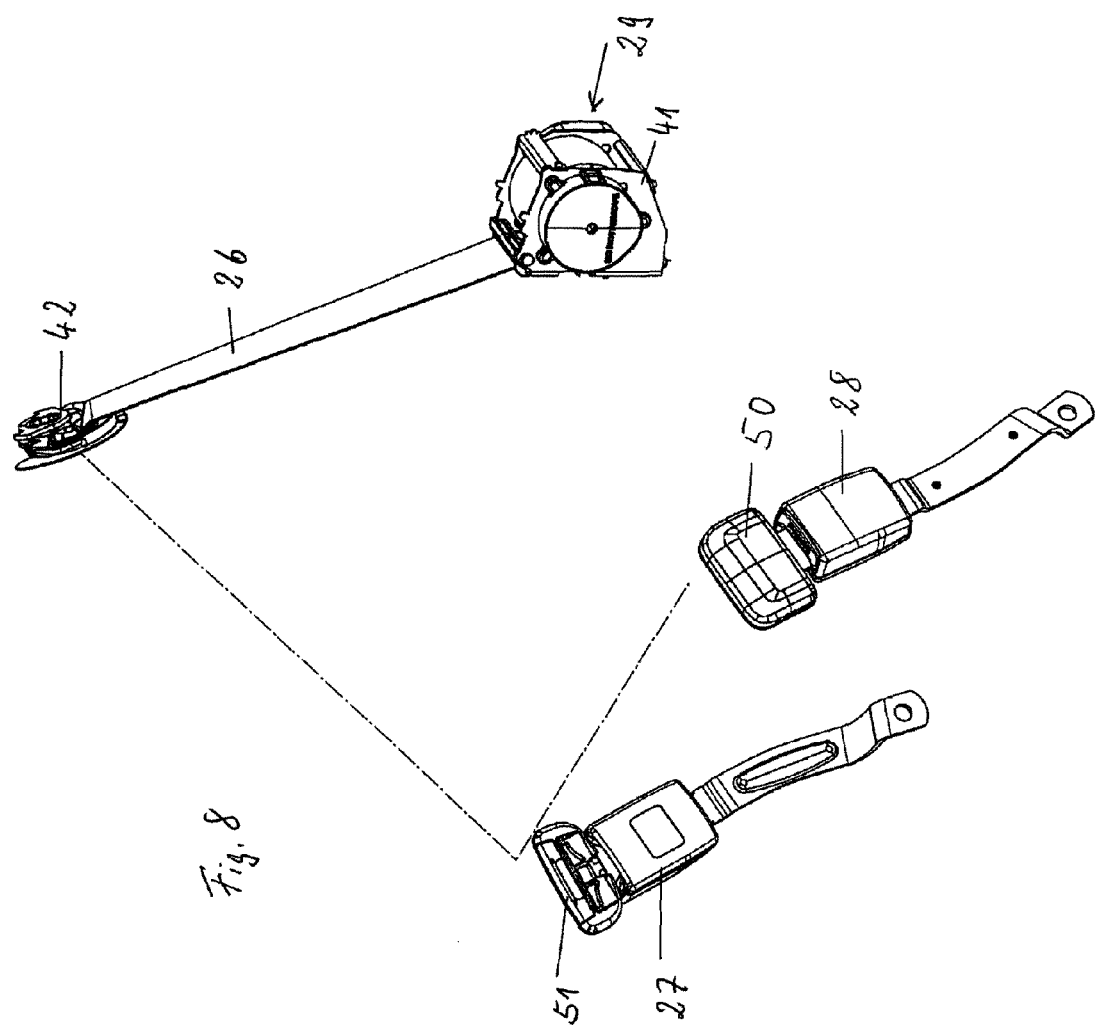

BELT RETRACTOR FOR A VEHICLE SAFETY BELT

RELATED APPLICATIONS

This application claims benefit of priority to PCT Application Serial Number PCT/EP2010/004469 filed Jul. 21, 2010, the disclosure of which is incorporated herein by reference in its entirety.

BACKGROUND OF THE INVENTION

1. Field of the Invention

The invention relates to a belt retractor for a vehicle safety belt.

2. Description of Related Art

Such a belt retractor is known, of example, from EP 1 003 654 B1. The prior art belt retractor has a belt reel onto which the safety belt is wound when the belt strap is reeled in and from which the safety belt can be unwound when the belt strap is pulled out. The belt retractor also has a belt strap-sensitive blocking mechanism which blocks extension of the belt strap when the belt strap is extended with excessive acceleration. The belt strap-sensitive device has an inertial mass which is mounted on the belt reel such that it can be moved against the force of a spring, and a belt strap-sensitive latch which is likewise mounted on the belt reel and which is moved into a blocking position by any movement of the inertial mass caused by excessive acceleration. Such a belt retractor is also known from DE 199 51 791 A1.

Whereas the belt strap-sensitive latch and the inertial mass in these prior art belt retractors are kept away by a spring biasing force from any blocking engagement when the safety belt is wound onto the belt reel, thus allowing the safety belt to be reeled in unimpeded by the belt strap-sensitive blocking mechanism, a belt retractor known from EP 0 273 584 is provided with an additional retarding device which prevents activation of the belt strap-sensitive blocking mechanism when the seat belt is wound onto the belt reel. The disk-shaped retarding device known from the prior art and designed with corresponding engagement recesses for the blocking latch rotates synchronously with the same rotational speed as the belt reel, with the result that the belt strap-sensitive blocking mechanism is rendered inoperable during the entire process of reeling in the belt strap. At the end of the process of reeling in the belt strap, the belt strap-sensitive blocking mechanism is released again for activation.

As the seat belt is reeled in at a relatively high belt reel speed in order to reel in the belt strap as quickly as possible, the belt reel stops rotating abruptly at the end of the process of reeling in the belt strap. This generates the risk of the belt strap-sensitive blocking mechanism being activated and extension of the belt strap being prevented. Sharp tugging on the safety belt when the belt strap is being pulled out in order to put on the safety belt can cause the belt strap-sensitive blocking mechanism to be activated, thus resulting in further extension of the belt strap being blocked. When seat backs in which the safety belt is wholly or partially integrated are folded forwards, this can lead to excessive acceleration of the belt strap extension and thus to activation of the belt strap-sensitive blocking mechanism.

BRIEF SUMMARY OF THE INVENTION

The object of the invention is to provide a belt retractor of the kind initially specified, in which extension of the belt strap is unimpeded when putting on the safety belt, without detriment to the safety functions of the seat belt.

The belt retractor according to the invention is provided with a retarding device which is in rotational connection with the belt reel and which prevents activation of the belt strap-sensitive blocking mechanism along a specified length of belt strap extension at the beginning of the belt strap extension process. The retarding device preferably rotates with gear reduction, so that belt strap-sensitive blocking of the safety belt is prevented along a specified length of belt strap extension at the beginning of belt strap extension.

The retarding device may be advantageously provided with a circular segmental track which is moved about the belt reel axis at the reduced speed and along which the belt strap-sensitive locking device which rotates with the belt reel at the same speed as the belt reel, in particular a latch for preventing any movement which initiates blocking, is guided.

To this end, the retarding device may have a stop face along which the belt strap-sensitive locking device or latch abutting the stop face to prevent any movement that initiates blocking is guided. The stop face extends along a circular segmental track about the belt reel axis.

To this end, the belt strap-sensitive latch may include a stop member. It is also possible to embody the circular segmental track along which the belt strap-sensitive locking device or latch, more specifically, is guided, as a segmentally shaped engagement track with which an engagement member provided in the latch or locking device engages.

The specified length of belt extension at the beginning of belt extension is measured in such a way that activation of the belt strap-sensitive blocking mechanism is possible again once the safety belt is being worn by the vehicle passenger. The length of the circular segmental track in the retarding device, along which the belt strap-sensitive locking device for preventing blocking is guided, and the gear reduction acting between the belt reel rotation and the rotation of the retarding device, in particular of the circular segmental track, are matched accordingly to each other. For example, the belt strap-sensitive blocking mechanism may be kept inactive by the retarding device during three to five turns of the belt reel, depending on the installation conditions in the vehicle.

It is advantageous when activation of the belt strap-sensitive blocking mechanism is prevented as soon as belt strap extension begins. This means that the belt strap-sensitive blocking mechanism is also kept inactive by the retarding device at the end, i.e. when the strap extension process is stopped. In this way, activation of the belt strap-sensitive blocking mechanism is prevented when the process of reeling in the belt strap (belt retraction) is abruptly stopped in the parked position.

In order to achieve the reduced rotation of the retarding device relative to the speed of the belt reel, a reduction gear mechanism is advantageously connected between the belt reel and the retarding device. This reduction gear mechanism may comprise a drive wheel which can be rotated about the belt reel axis, and a control wheel driven by the drive wheel. The drive wheel and the control wheel are preferably embodied as gear wheels, with gear reduction being achieved by dimensioning the pitch circle diameters appropriately. The control wheel rotates with a reduced speed relative to the belt reel, said speed being transferred to the rotated retarding device and in particular to the segmentally shaped guideway of the retarding device.

The gear reduction ratio and the length of the circular segmental track in the retarding device are dimensioned such that activation of the belt strap-sensitive blocking mechanism is prevented along a length of belt extension approximately equal to that required for the vehicle passengers to put on the seat belt. Activation of the belt strap-sensitive blocking mechanism can also be prevented along a length of belt extension which, in the case of a safety belt which is wholly or partially integrated into the seat, is drawn from the belt reel when folding down the back rest. In particular, this can also be a motor vehicle seat or bench seat provided in the rear of the vehicle in order to increase the size of the luggage compartment.

The belt retractor according to the invention is preferably suitable for use in motor vehicle seats which can be folded down to increase the size of the luggage compartment in the vehicle, and in particular which can be lowered into the floor of the load compartment. Belt buckles are often provided on both sides of such motor vehicle seats. The associated belt retractor has two tongues on its safety belt, the one tongue being inserted into the one belt buckle, in particular into the belt buckle located on the side on which the belt retractor is disposed, and the other tongue being inserted into the belt buckle on the other side of the seat in order to form a three-point seat belt. When releasing the safety belt, only one of the two tongues is released from the belt buckle in many cases, with the result that one tongue remains in one of the belt buckles, in particular in the belt buckle located at the side on which the belt retractor is likewise mounted on the motor vehicle seat, in particular in the seat back or on the vehicle body, in particular in the roof area. In order that the safety belt can be pulled out of the belt retractor unimpededly when the seat is folded down and in particular when it is lowered into the floor, with the belt buckles being pivoted as well, the retarding device acts on the belt strap-sensitive blocking mechanism in the manner described above.

A second retarding device which prevents activation of the vehicle-sensitive blocking mechanism along a specified length of belt strap extension at the beginning of the belt strap extension process may preferably be provided in addition. Movement of the second retarding device is controlled by rotating the belt reel via a second gear, in particular via a reduction gear mechanism. The retarding device preferably acts on the vehicle-sensitive blocking mechanism parallel to and simultaneously with the retarding device that acts on the belt strap-sensitive blocking mechanism.

The rotatable components of the retarding device for the belt strap-sensitive blocking mechanism and of the associated gear and/or of the retarding device for the vehicle-sensitive blocking mechanism and of the associated gear are preferably mounted rotatably on a common shaft portion and on a housing section, in particular on a housing cap. This permits simplified assembly of the respective retarding device and in particular of both retarding devices and of the associated gear or of the associated gear in the housing section. The arrangement pre-mounted in this manner in the housing section, in particular in the housing cap which can be slipped onto the frame of the belt retractor, may then be connected in the correct position to the mechanical side of the belt retractor having the belt strap-sensitive and/or vehicle-sensitive blocking mechanism.

The action of the retarding device, not only on the belt strap-sensitive blocking mechanism, but also on the vehicle-sensitive blocking mechanism, is such that the moveable parts of the respective blocking mechanism are stationarily fixed to that insulation is provided against any sounds emanating from those parts.

It is also possible, according to the invention, to provide only the retarding device for the vehicle-sensitive blocking mechanism on the belt retractor.

BRIEF DESCRIPTION OF THE DRAWINGS

The invention shall now be described in greater detail with reference to the Figures, in which

FIG. 7 shows a cross-sectional view along plane B-B in FIG. 4; and

FIG. 8 shows a schematic view of the arrangement of two belt buckles and of the belt retractor, in particular when using the load floor of a vehicle having motor vehicle seats that fold into the floor.

DETAILED DESCRIPTION OF THE INVENTION

The embodiments in the figures show, on the mechanical side of a belt retractor for a vehicle safety belt, a belt strap-sensitive blocking mechanism 12 and a retarding device 1 with which activation of the belt strap-sensitive blocking mechanism 12 is prevented along a specified length of belt strap extension at the beginning of the belt strap extension process.

Figure 5:
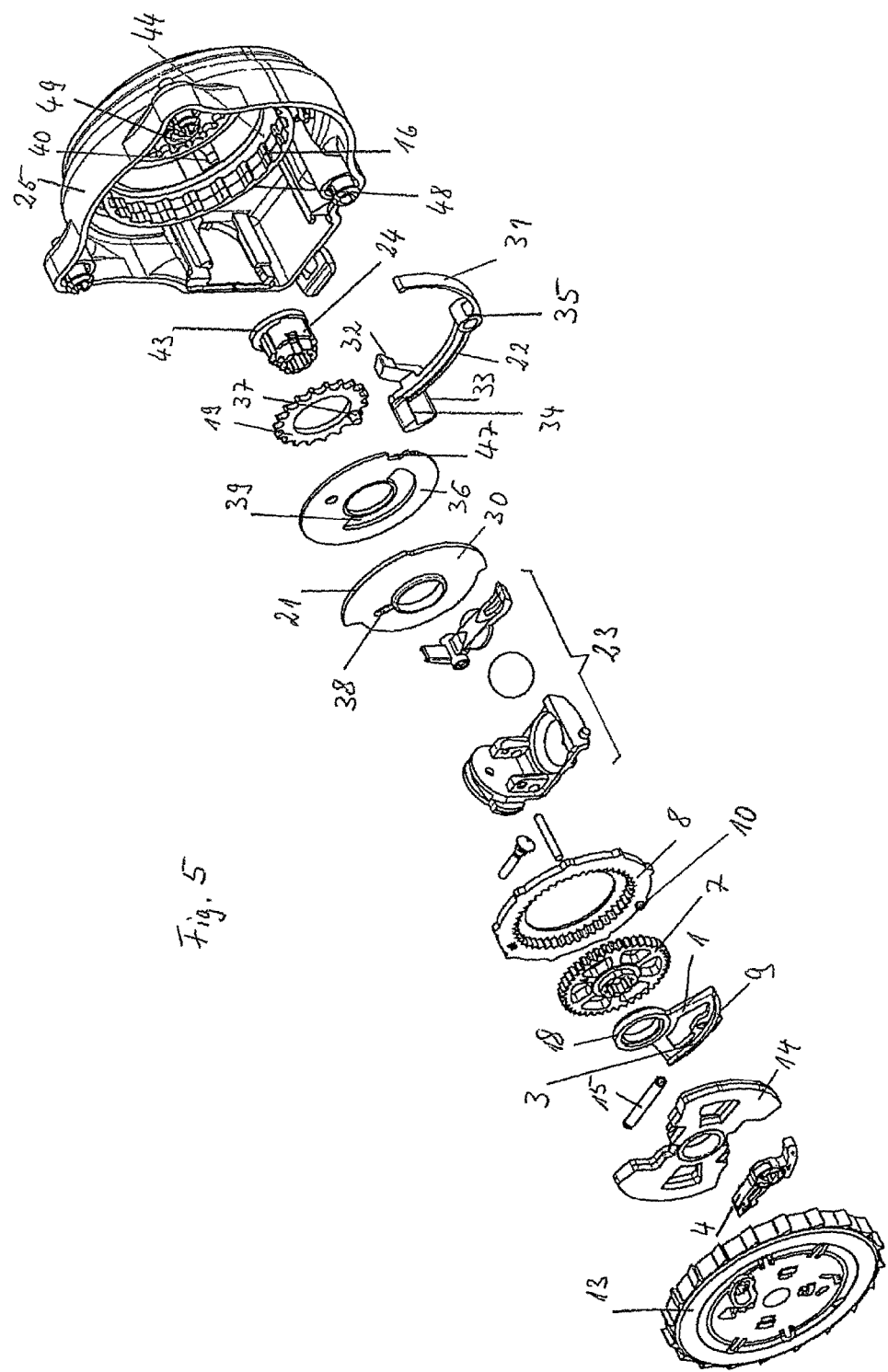
FIG. 5 shows an exploded view of the embodiment shown in FIG. 4.

The belt strap-sensitive blocking mechanism 12 includes an inertial mass 14 which is movably mounted, in particular pivotably mounted on a belt reel 2 of the belt retractor and which is pre-tensioned into an unlocked position with the aid of a spring 15. The inertial mass 14 acts with a control face on a belt strap-sensitive latch 4, which is likewise movably mounted on belt reel 2. It is also possible to use another suitable engagement part instead of the latch, or to embody the latch or engagement part integrally with the inertial mass. A belt strap-sensitive locking device is formed in this way. When belt reel 2 is rotated with excessive acceleration, the inertial mass 14 moves against the force of spring 15 and moves latch 4 into blocking engagement with inner blocking toothing 16 (FIG. 5). This blocking toothing 16 may be provided on a stationary housing section 25 of the belt retractor, or on a control part to which the rotational movement of the belt reel is transferred as a result of the latch engagement in order to actuate a main blocking latch. The main blocking latch engages with a ratchet wheel 13 which is non-rotatingly connected to the belt reel. A belt strap-sensitive blocking mechanism acting in such a manner and a main blocking mechanism are known from EP 1 003 654 B1, for example.

In the embodiment, retarding device 1 comprises a segmentally shaped plate on which a segmentally shaped guideway in the form of a stop face 3 is provided. Retarding device 1 is mounted rotatably about a belt reel axis 6, about which belt reel 2 also rotates when reeling the belt strap in and out. The stop face 3 which forms a guideway extends substantially parallel to belt reel axis 6 and along a circular arc about belt reel axis 6. In the embodiment shown, retarding device 1 is located between the belt strap-sensitive blocking mechanism 12 and the reduction gear mechanism 5.

A stop member 11 in the form of a stop pin which can be made to engage along a specified length of belt strap extension at the beginning of the belt strap extension process is formed on the belt strap-sensitive latch 4. This prevents activation of the belt strap-sensitive blocking mechanism 12, as will be explained in detail.

Stop face 3 forms a guideway along which stop member 11 is guided. Instead of being formed by stop face 3, the guideway may also be formed on retarding device 1 by a segmentally shaped engagement point, for example an engagement groove with which a correspondingly configured engagement member on latch 4 engages, instead of the pin-shaped stop member 11. Instead of the plate-shaped configuration of retarding device 1, connecting webs or a connecting frame may be provided, with which the segmentally shaped guideway is rotatably mounted about belt reel axis 6.

A reduction gear mechanism 5 is used to transfer the rotational movement of the belt reel 2 to retarding device 1. Said reduction gear mechanism 5 comprises a drive wheel 7 which is mounted rotatably about belt reel axis 6 and which is connected in rotatable driven communication to belt reel 2 via a drive shaft 17. Retarding device 1 may be rotatably mounted on said drive shaft 17 or on a shaft portion 24 by means of a sleeve bearing 18. The reduction gear mechanism 5 also has a control wheel 8 which transfers its rotational movement to retarding device 1. Drive wheel 7 is embodied as an inner wheel, and control wheel 8 is embodied as an outer wheel. In the embodiment shown, drive wheel 7 is in torque-transferring engagement with the inner toothing of control wheel 8 by means of its outer toothing. When drive wheel 7 connected non-rotatingly via drive shaft 17 to belt reel 2 is being driven, control wheel 8 rotates at a reduced speed, and the rotational axis of control wheel 8 moves eccentrically about belt reel axis 6. An eccentric guide face 44 is provided for this purpose around the inside of housing section 25. In order to transfer the rotational movement to retarding device 1, a drive pin 10 which engages with an elongate hole 9 on retarding device 1 is provided on control wheel 8. In this way, the rotational connection between control wheel 8 and retarding device 1 is produced.

The reduction gear mechanism 5 may also have a different design. For example, an intermediate gear wheel may be provided between drive wheel 7 and control wheel 8, wherein said control wheel 8 may also be mounted rotatably about belt reel axis 6. In this case, the guideway, in particular stop face 3, may also be disposed on control wheel 8.

At the end of the belt reeling-in process and at the beginning of the belt strap extension process, latch 4 in the embodiment shown is in engagement with the segmentally shaped guideway, which is embodied on retarding device 1 by stop face 3. During extension of the belt strap, the belt reel is rotated about belt reel axis 6. This rotational movement is transferred with the same rotational speed to drive wheel 7. Due to the different diameters of the toothings on drive wheel 7 and on control wheel 8, control wheel 8 is made to rotate at a reduced rotational speed, its rotational axis moving eccentrically about belt reel axis 6, as already described. The rotational movement is transferred with a reduced rotational speed to retarding device 1 by the rotational engagement established between control wheel 8 and retarding device 11 with the aid of the elongate hole 9 extending radially in relation to belt reel axis 6 radial and drive pin 10 engaging therewith.

Due to the different diameters of the toothings on drive wheel 7 and on control wheel 8, the rotational movement of the belt reel 2 is transferred with gear reduction to retarding device 1. During extension of the belt strap, latch 4 abuts stop face 3 via the pin-shaped stop member that likewise extends parallel to belt reel axis 6. Latch 4 and stop member 11 rotate with the same rotational speed as belt reel 2, while the segmentally shaped stop face 3 rotates about belt reel axis 6 at the reduced speed. The gear reduction and the length of the segmentally shaped guideway on stop face 3 are dimensioned such that, commencing with extension of the belt strap along a specified length of belt strap extension that is less than the length of belt extension required for vehicle passengers to put on the seat belt, latch 4 is kept disengaged from the inner blocking toothing 16 by the engagement at stop face 3. This deactivation of the belt strap-sensitive blocking mechanism is effected independently of the acceleration with which extension of the belt strap is performed. When the predetermined length of belt strap extension is reached, the pin-shaped stop member 11 leaves stop face 3, as a result of which the belt strap-sensitive blocking mechanism 12 can be activated, in particular when the safety belt is being worn by the vehicle passenger.

Figure 4:
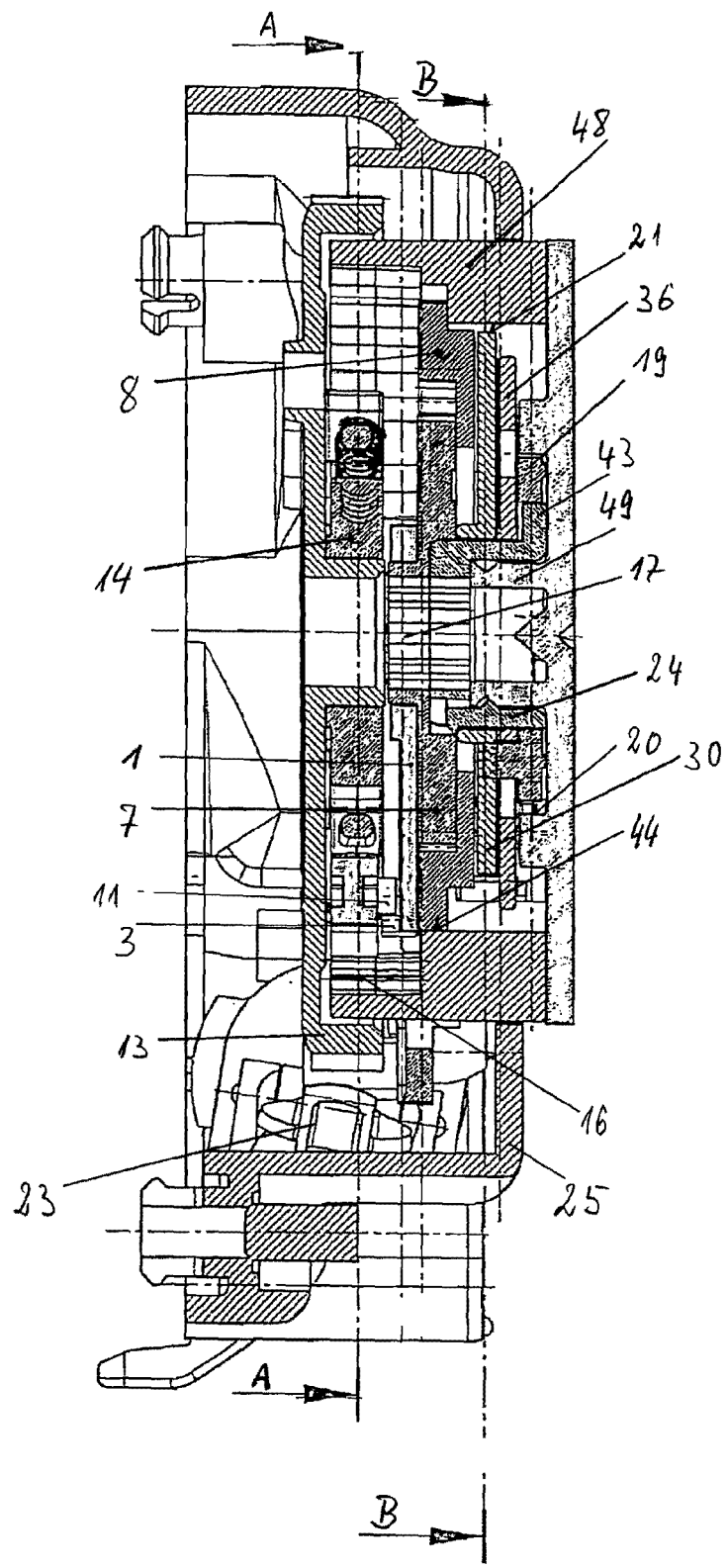
FIG. 4 shows a cross-sectional view of an embodiment in the assembled state, in which a retarding device is also provided for the vehicle-sensitive blocking mechanism.

Since retarding device 1 for deactivating the belt strap-sensitive blocking mechanism is effective between the parked position, which is reached when the safety belt is fully reeled in, and a specified length of belt strap extension which is approximately required to fasten the belt of a vehicle passenger, or is effective for a shorter length of belt extension, the retarding device according to the invention can also be used in the kind of belt retractors where the aim is to lock a child's seat in place or to lock voluminous objects in place with the aid of the safety belt. Such belt retractors are known, for example, from DE 199 51 791 or from EP 0 625 449 A1. As will be explained with reference to FIGS. 4 and 5, a control cam 36 rotatable about belt reel axis 6 and interacting with actuating member 22 may be provided for this purpose. Locking is effected in this case by means of an engagement part 34 which is provided on actuating member 22 and which engages with ratchet wheel 13.

Figure 1:
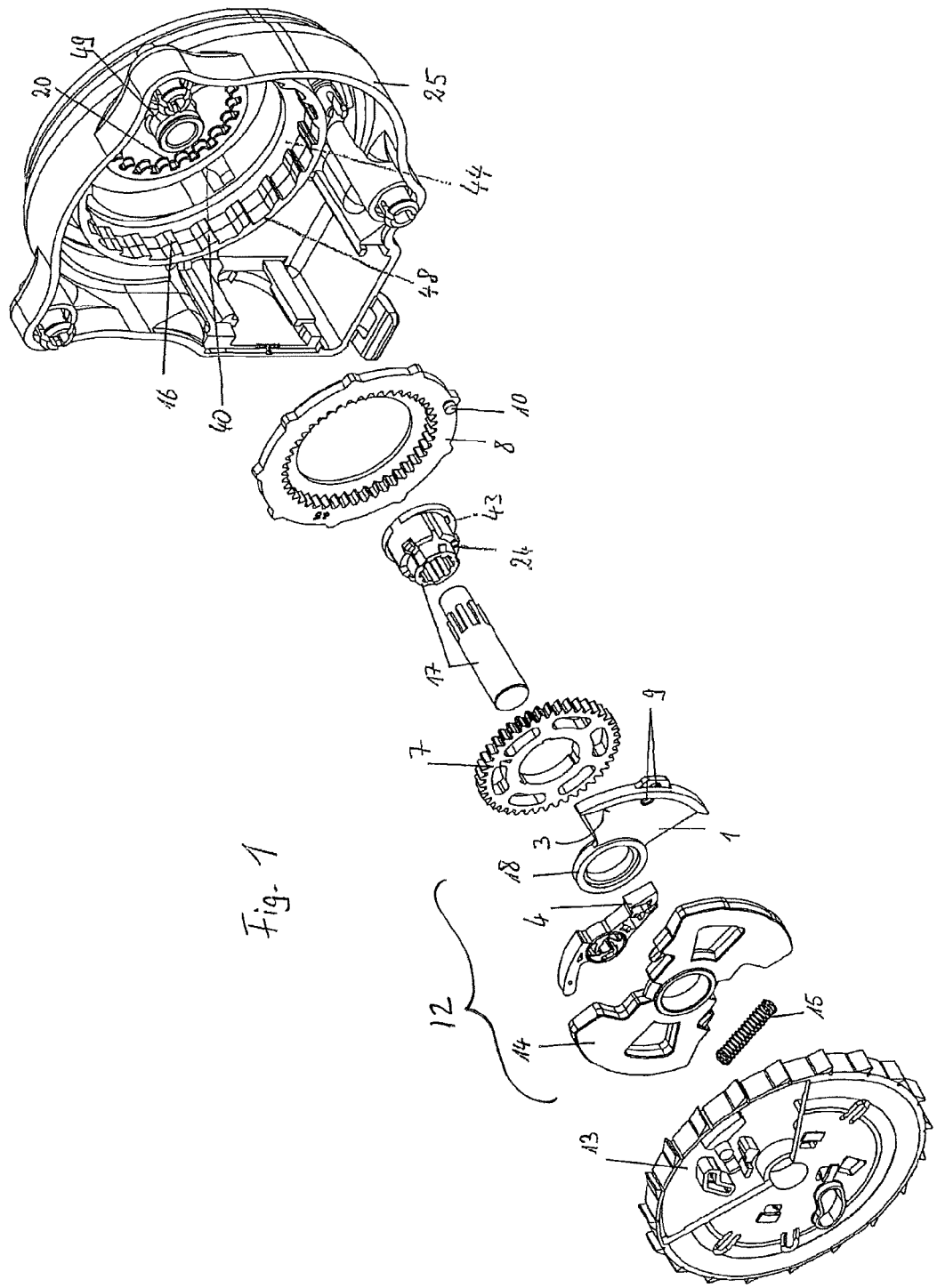
FIG. 1 shows an exploded view of a belt strap-sensitive blocking mechanism of a belt retractor, comprising an embodiment of a retarding device with which activation of the belt strap-sensitive blocking mechanism is prevented along a specified length of belt strap extension.
Figure 2:
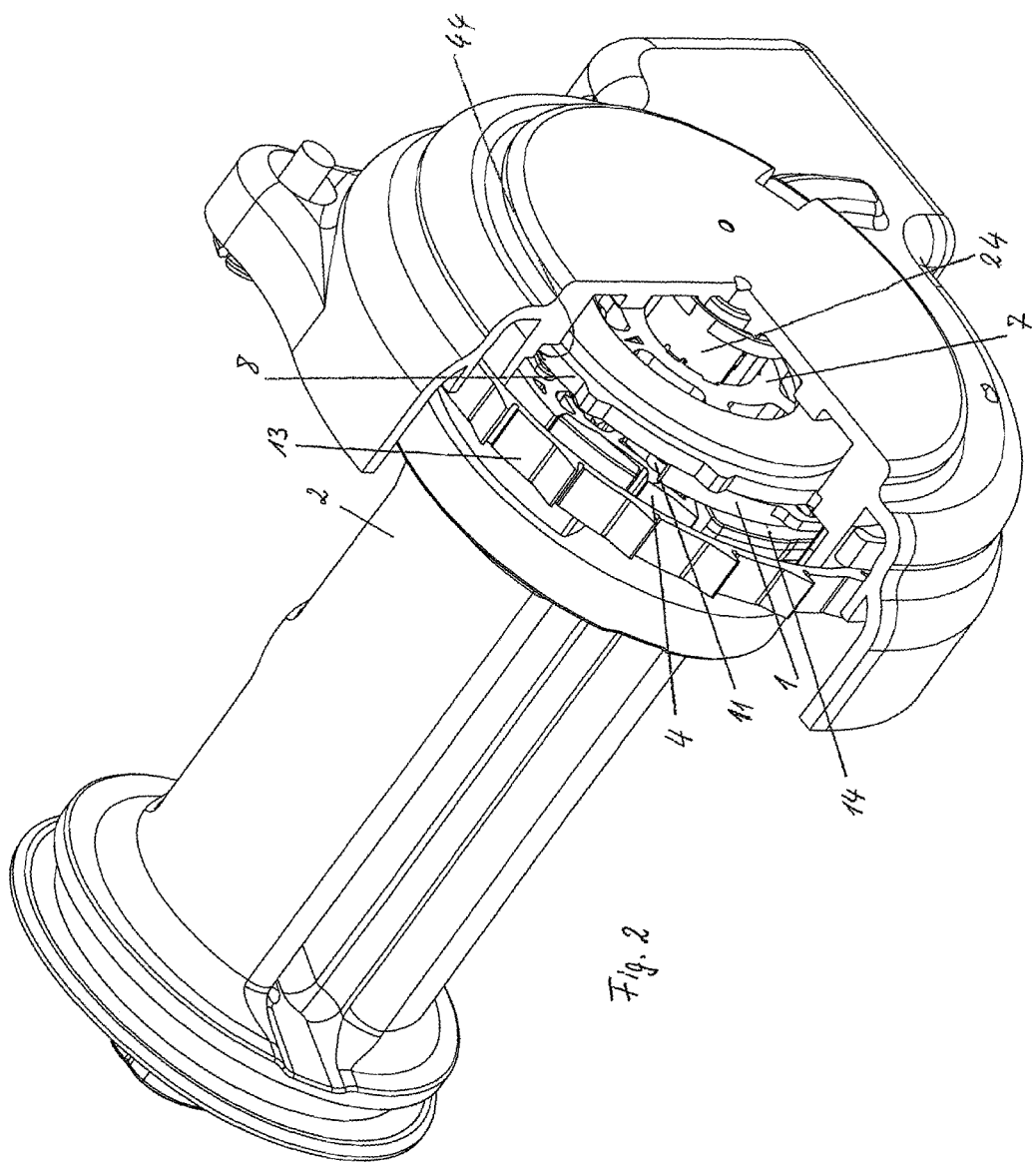
FIG. 2 shows a perspective view, from the side and from above, of the embodiment in the assembled state.
Figure 3:
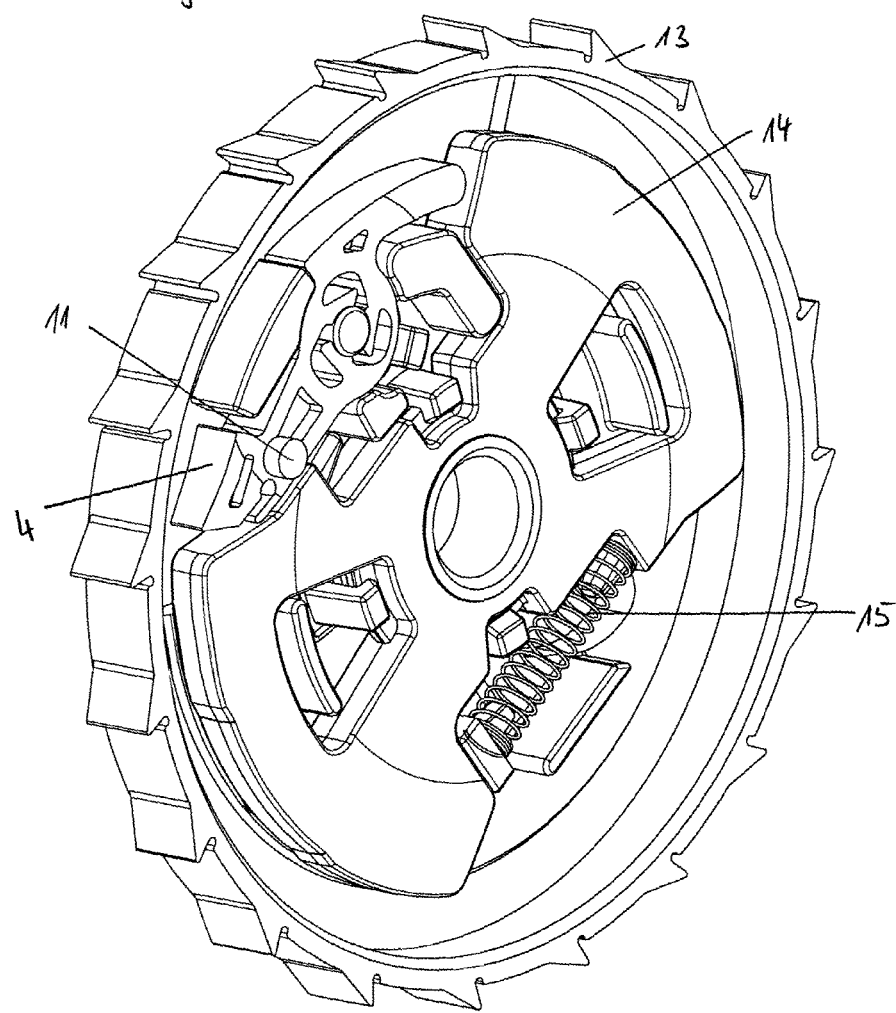
FIG. 3 shows the belt strap-sensitive blocking mechanism with a latch which is adjusted to the invention as an embodiment.

In the embodiment shown in FIGS. 4 to 7, in addition to retarding device 1 for the belt strap-sensitive blocking mechanism 12 as shown in FIG. 1, a second retarding device is provided which generally comprises a control face 21 provided on control cam 30 and interacting with actuating member 22. This second retarding device has a deactivating effect on a vehicle-sensitive blocking mechanism 23. This deactivation of the vehicle-sensitive blocking mechanism 23 is effected simultaneously with the deactivation of the belt strap-sensitive blocking mechanism as described above.

A gear which transfers the rotational movement of belt reel 2 to control cam 30 is provided for controlling the second retarding device. This gear comprises a drive wheel 19 and an inner gear wheel 20 which is provided on the inner side of housing section 25. Drive wheel 19 is rotatably mounted on shaft portion 24, on an eccentric cam 43 of said shaft portion. The rotational movement of belt reel 2 is transferred via shaft portion 24 to drive wheel 19, and due to the eccentric bearing, drive wheel 19 performs an eccentric movement about belt reel axis 6 and engages inner gear wheel 20 with its outer gear wheel thereby. In this way, the rotational speed of belt reel 2 is reduced with the aid of the gear, since the diameter of inner gear wheel 20 is larger than the diameter of the outer gear wheel of drive wheel 19. The rotational movement of drive wheel 19 is transferred via a drive pin 37, which engages with an elongate hole 38 on control cam 30, to control cam 30 and to control face 21, which is embodied as a protruding edge on the periphery of control cam 30.

Figure 6:
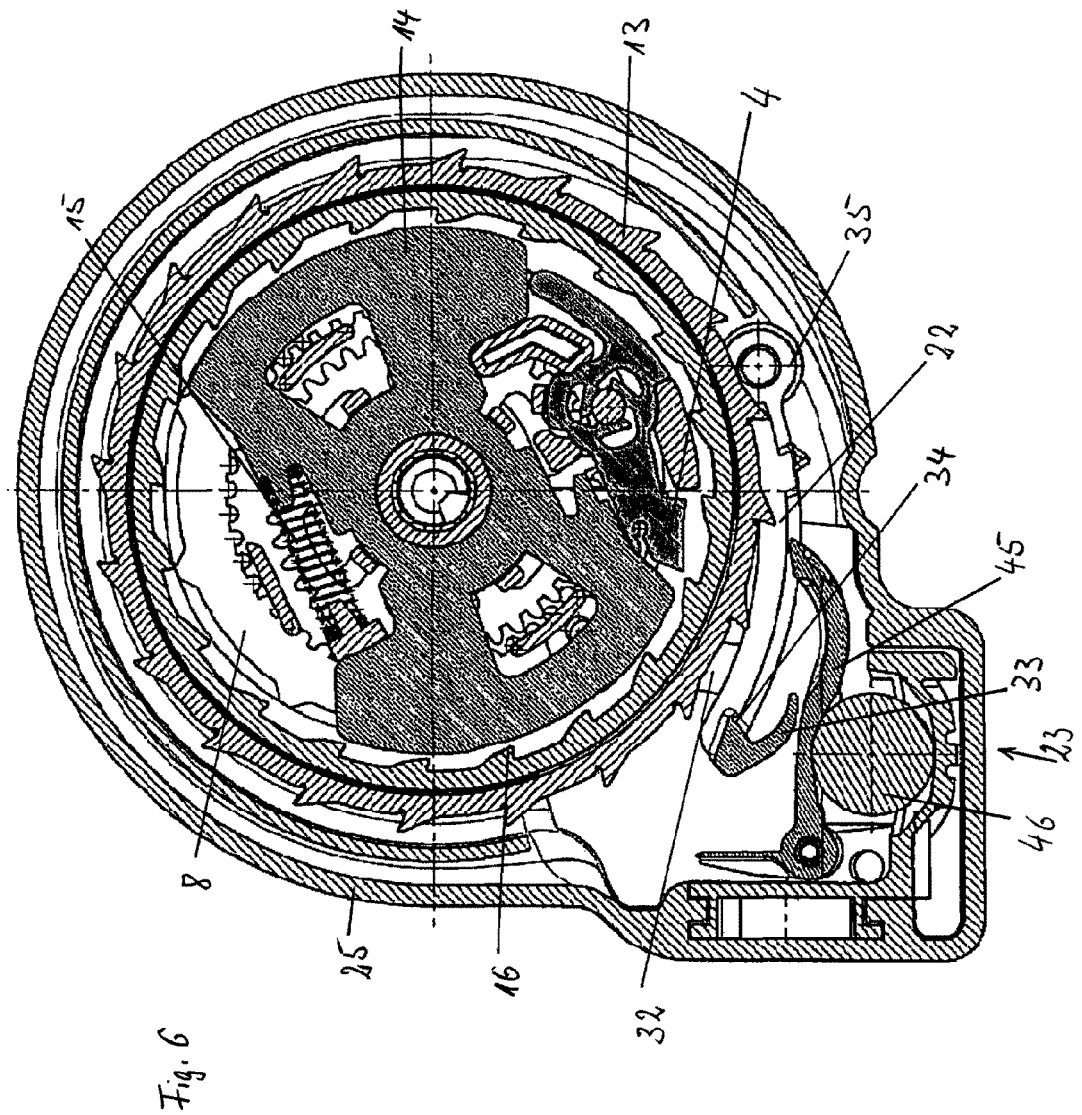
FIG. 6 shows a cross-sectional view along plane A-A in FIG. 4.

Control face 21 provided in the form of a cam face or cam edge on control cam 30 has a larger diameter than the rest of control cam 30. Control cam 30 is mounted rotatably about belt reel axis 6, preferably on shaft portion 24. When the vehicle-sensitive blocking mechanism 23 shown in FIGS. 4 to 7 is deactivated, control cam 30 is rotated until control pick-up 32 on actuating member 22 engages with control face 21. As shown in FIG. 6, actuating member 22 is pivoted about its rotary bearing 35 provided on housing section 25, in such a way that an engagement part 33 provided on actuating member 22 keeps a ratchet pawl 45 of the vehicle-sensitive blocking mechanism 23 disengaged from the outer toothing of latch wheel 13, which is non-rotatingly connected to belt reel 2. In the process, an inertial mass 46 which may also be embodied as a ball is pressed so far into its receptacle that movement is prevented. When the vehicle-sensitive blocking mechanism 23 is deactivated in the manner described, this results in sound insulation because the moveable parts of said blocking mechanism are kept in an immobile state by the second retarding device. This also applies to the moveable parts of the belt strap-sensitive blocking mechanism, in which latch 4 and the inertial mass 14 interacting therewith are kept in an immobile state by retarding device 1.

Actuating member 22 is embodied as a lever which is mounted in the rotary bearing 35 on housing section 25. With the aid of a spring 31, which is supported on housing section 25 and which may be embodied as a flat spring, actuating member 22 is pre-tensioned towards the periphery of control cam 30. A different spring biasing force, for example a helical spring or an elastic material, may be provided. On actuating member 22, at the opposite end of the lever from rotary bearing 35, there is provided an engagement part 33 which connects, as discussed above, to the vehicle-sensitive blocking mechanism 23, and an engagement part 34, which can connect to the outer toothing of latch wheel 13. The aforementioned locking of a child's seat can be effected in this way. Control pick-up 32 projects thereby into a recess 47 provided on the peripheral edge of control cam 36 (FIG. 5). In order to achieve unimpeded extension of the belt strap for the child's seat lock, a segmentally shaped recess 39 through which drive pin 37 projects is provided in said control cam 36.

Actuating member 22 is disposed on housing section 25 outside a substantially cylindrically shaped projection 48 provided on the inside wall of housing section 25. The inner blocking toothing 16 and the eccentric guide face 44 (FIGS. 1 and 5) for control wheel 8 are located on the inner side of this cylindrical projection 48. In order to connect control pick-up 32 to the two control cams 30 and 36, control pick-up 32 projects through a housing recess 40 in cylindrical projection 48.

For common rotatable mounting of the components of the retarding device for the belt strap-sensitive blocking mechanism, and/or of the retarding device for the vehicle-sensitive blocking mechanism, and in order to ensure simplified assembly of these components in housing section 25, these components are preferably mounted on the common shaft portion 24. This shaft portion 24, which is preferably embodied as a hollow shaft, is rotatably mounted, for its part, on a stub shaft 49 which is aligned with belt reel axis 6 and which projects from the inner wall into the interior of housing section 25. Shaft portion 24 is connected in rotatably driven communication to belt reel 2. This can be done via drive shaft 17.

Housing section 25 is preferably embodied as a cap-shaped housing section which can be slipped onto a frame 41 of the belt retractor. Due to this special configuration, all the parts of the respective retarding device and of the associated gear in housing section 25 which are rotatable about belt reel axis 6 are pre-mounted on shaft portion 24.

As will be explained with reference to FIG. 9, a belt retractor 29 with an inventive retarding device for the belt strap-sensitive blocking mechanism and/or with a retarding device for the vehicle-sensitive blocking mechanism is preferably used on a motor vehicle seat that can be folded down, and in particular which can be lowered into the floor of the luggage compartment in order to increase the volume of the luggage compartment. Belt buckles 27 and 28 (FIG. 8) are provided on either side of the seating surface of such motor vehicle seats. Belt retractor 29 may be disposed in the seat back or in the region of the seat back, or also in the region of the car body, in particular in or near the roof area. Safety belt 26 is equipped with two tongues 50, 51, the one tongue 50 being attached to the end of the belt strap and the other tongue 51 being slideably mounted on safety belt 26. Tongue 50 attached to the end of the safety belt 26 is inserted into belt buckle 28, which is located on the side of the seat on which belt retractor 29 is also disposed inside the vehicle. In the embodiment shown in FIG. 8, tongue 50 located at the end of safety belt 26 is inserted into belt buckle 28. This fixes the end of safety belt 26, as in a normal fitting at the end of a three-point seat belt. When putting on the seat belt, tongue 51 is inserted into belt buckle 27 located on the other side of the seat, thus achieving a three-point seat-belt arrangement. Safety belt 26 may be guided to belt buckles 27 and 28 directly from belt retractor 29 or via a deflection mechanism 42 which may be adjustable in height.

In many cases, the vehicle passenger releases only tongue 51 from belt buckle 27, when removing the safety belt, and forgets to remove tongue 50 from belt buckle 28 as well. If belt buckles 27 and 28 are pivoted as well when folding down the motor vehicle seat, and in particular when lowering the motor vehicle seat into the floor of the luggage compartment, safety belt 26 is pulled from belt retractor 29. This risks blocking one of the two blocking mechanisms, in particular the belt strap-sensitive blocking mechanism, and preventing further extraction of safety belt 26 from belt retractor 29. This makes it more difficult to fold down the motor vehicle seat any further, and in particular to lower it into the floor area, or causes vehicle passengers to believe, due to several failed attempts, that such folding or lowering is impossible.

By means of the retarding devices described in the foregoing, in particular by means of the retarding device for the belt strap-sensitive blocking mechanism, blocking of the belt strap-sensitive blocking mechanism and/or of the vehicle-sensitive blocking mechanism is prevented in the pivot range of the foldable seat and in particular in the pivot range of belt buckles 27 and 28, in particular of the belt buckle located on the side of belt retractor 29.

According to the invention, three embodiments of the inventive belt retractor are possible. In a first embodiment, the belt retractor is fitted with a retarding device for the belt strap-sensitive blocking mechanism. In a second embodiment, the belt retractor is fitted not only with a retarding device for the belt strap-sensitive blocking mechanism, but also with a retarding device for the vehicle-sensitive blocking mechanism. In a third embodiment, the belt retractor is fitted with a retarding device for the vehicle-sensitive blocking mechanism.

LIST OF REFERENCE SIGNS

1 Retarding device
2 Seat belt reel
3 Stop face

4 Belt strap-sensitive latch
5 Reduction gear mechanism
6 Axis of the belt reel
7 Drive wheel
8 Control wheel
9 Elongate hole
10 Drive pin
11 Stop member (stop pin)
12 Belt strap-sensitive blocking mechanism
13 Ratchet wheel
14 Inertial mass
15 Spring
16 Inner blocking toothing
17 Drive shaft
18 Sleeve bearing
19 Drive wheel
20 Inner gear ring
21 Control face (control edge)
22 Actuation member
23 Vehicle-sensitive blocking mechanism
24 Common shaft portion
25 Housing section
26 Safety belt
27 Seat belt buckle
28 Seat belt buckle
29 Belt retractor
30 Control cam
31 Spring
32 Control pick-up
33 Engagement part on the vehicle sensor
34 Engagement part on the ratchet wheel
35 Rotary bearing
36 Control cam
37 Drive pin
38 Elongate hole
39 Recess
40 Housing recess
41 Frame
42 Deflection mechanism
43 Eccentric cam
44 Eccentric guide face
45 Ratchet pawl
46 Inertial mass
47 Recess
48 Cylindrical protrusion
49 Stub shaft
50 Tongue
51 Tongue

The invention claimed is:

1. A belt retractor for a vehicle safety belt, comprising a belt reel onto which the safety belt is wound when the belt strap is reeled in and from which the safety belt can be unwound when the belt strap is pulled out, a belt strap-sensitive blocking mechanism which blocks extension of the belt strap when the belt strap is extended with excessive acceleration, and/or a vehicle-sensitive blocking mechanism which blocks extension of the belt strap when the vehicle accelerates excessively, characterized in that a retarding device (1) is rotatably connected to the belt reel (2) and has a circular segmental track (3) which is moved about the belt reel axis (6) with gear reduction and embodied as a segmentally shaped guideway, along which a belt strap-sensitive latch (4) is guided with engagement or abuttingly in order to prevent any latching movement which initiates blocking along a specified length of belt strap extension at the beginning of the belt strap extension process.

2. The belt retractor according to claim 1, characterized in that the specified length of belt strap extension, during which blocking is prevented, corresponds to about three to five turns of the belt reel.

3. The belt retractor according to claim 2, characterized in that the retarding device (1) prevents activation of the belt strap-sensitive blocking mechanism (12) as soon as strap extension begins.

4. The belt retractor according to claim 3, characterized in that a reduction gear mechanism (5) which reduces the rotation of the retarding device (1) in relation to the rotation of the belt reel (2) is connected between the belt reel (2) and the retarding device (1).

5. The belt retractor according to claim 1, characterized in that the stop face (3) extends along a circular segment about the belt reel axis (6) and is connected in rotatably driven communication to the belt reel (2) about the belt reel axis (6) at the reduced rotor speed produced by the reduction gear mechanism (5).

6. The belt retractor according to claim 5, characterized in that the reduction gear mechanism (5) transfers the rotational movement of the belt reel (2) to the segmentally shaped guideway (3).

7. The belt retractor according to claim 6, characterized in that the retarding device (1) is disposed between the reduction gear mechanism (5) and the belt reel (2).

8. The belt retractor according to claim 7, characterized in that the reduction gear mechanism (5) has a drive wheel (7) which is driven by the belt reel (2) and which is in rotatable engagement with a control wheel (8) that is non-rotatingly connected to a guide face of the retarding device (1).

9. The belt retractor according to claim 8, characterized in that (7) the drive wheel is embodied as an inner wheel and the control wheel (8) is embodied as an outer wheel.

10. The belt retractor according to claim 9, characterized in that the drive wheel (7) is mounted rotatably about the belt reel axis (6) and the control wheel (8) performs an eccentric movement about the belt reel axis (6).

11. The belt retractor according to claim 10, characterized in that the rotational movement of the drive wheel (7) can be transferred via an intermediate gear wheel to the control wheel (8) that is rotatable about the belt reel axis.

12. The belt retractor according to claim 11, characterized in that the control wheel (8) is non-rotatingly connected to the segmentally shaped guide face (3) via a driving pin (10) which engages with a radially extending elongate hole (9).

13. The belt retractor according to claim 12, characterized in that a stop member (11) which is embodied as a stop pin, in particular, is formed on the belt strap-sensitive latch (4), and that the stop member (11) abuts the guideway embodied as a stop face (3) in order to prevent activation of the belt strap-sensitive blocking mechanism (12).

14. The belt retractor according to claim 13, characterized in that activation of the belt strap-sensitive blocking mechanism (12) is prevented by the retarding device (1) when the safety belt is completely reeled in.

15. The belt retractor according to claim 14, characterized in that activation of the belt strap-sensitive blocking mechanism (12) is required up to a length of belt extension that is approximately required to fasten the belt of a vehicle passenger, or is prevented up to a shorter length of belt extension.

* * * * *